United States Patent [19]
Carlson et al.

[11] 3,820,629
[45] June 28, 1974

[54] ACOUSTICAL LOUVER FOR EARTHMOVING VEHICLES

[75] Inventors: Robert D. Carlson, Plainfield; Jack H. Kraina, Aurora; Robert C. Wegner, Oswego, all of Ill.

[73] Assignee: Caterpillar Tractor Co., Peoria, Ill.

[22] Filed: Feb. 2, 1973

[21] Appl. No.: 328,947

[52] U.S. Cl............. 181/33 G, 180/69 R, 181/33 K
[51] Int. Cl.......................... E04b 1/84, B62d 25/10
[58] Field of Search............ 181/33 GB, 33 K, 33 R, 181/42, 33 G, 35 R, 36 R; 180/1 R, 69 R; 296/39 A, 39 R; 98/121 R

[56] References Cited
UNITED STATES PATENTS

| | | | |
|---|---|---|---|
| 2,590,204 | 3/1952 | Phillips | 181/33 GB UX |
| 2,855,039 | 10/1958 | Gross | 181/33 GB UX |
| 3,390,625 | 7/1968 | Maxson | 98/121 R |
| 3,630,310 | 12/1971 | Federer | 181/33 G |
| 3,762,489 | 10/1973 | Proksch et al. | 181/33 K X |

*Primary Examiner*—Richard B. Wilkinson
*Assistant Examiner*—John F. Gonzales
*Attorney, Agent, or Firm*—Phillips, Moore, Weissenberger, Lempio & Strabala

[57] ABSTRACT

A sound attenuation system having a plurality of acoustical louvers readily removably mounted across an air circulation opening in the engine enclosure of an earthmoving vehicle. Each acoustical louver includes an acoustical foam material batt mounted within an elongated D-shaped sheet material holder which has unattached overlapping end portions for allowing the compression of the holder and batt for facile manual installation in mounting rack slots disposed at opposite sides of said air circulation opening wherein the louver is held in place by spring tension which assures retention of the louver during use but allows rapid removal thereof, without recourse to special tools, for maintenance.

7 Claims, 5 Drawing Figures

PATENTED JUN 28 1974    3,820,629
SHEET 2 OF 2
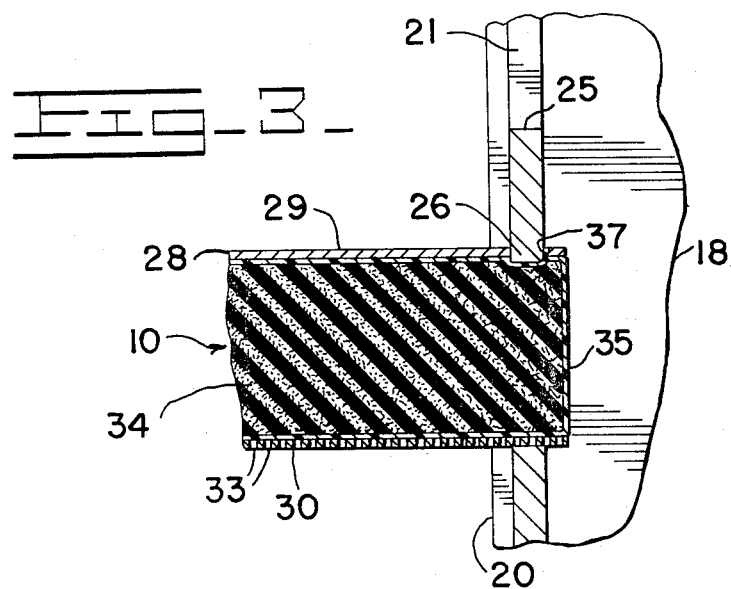
FIG-3-
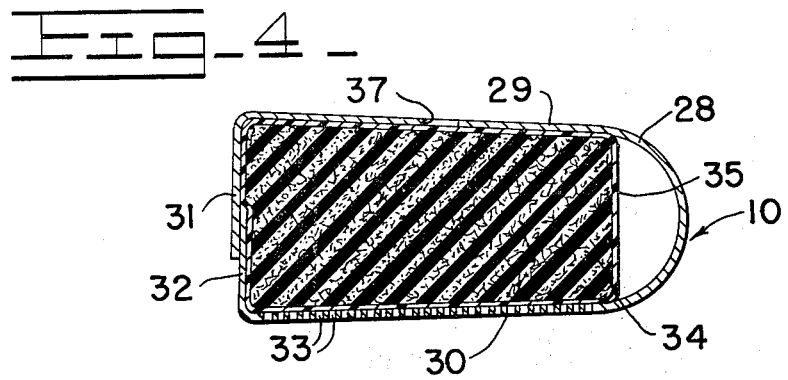
FIG-4-
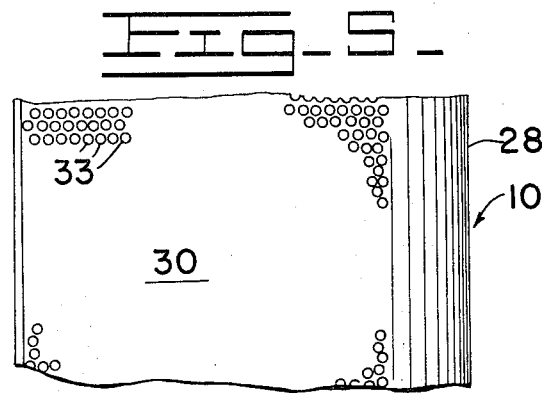
FIG-5-

3,820,629

ACOUSTICAL LOUVER FOR EARTHMOVING VEHICLES

BACKGROUND OF THE INVENTION

Recent Federal legislation applicable to earthmoving vehicles has imposed rather stringent limitations upon the noise levels to which the operators of such vehicles and spectators may be exposed. To adequately protect persons and the environment from excessive noise levels, acoustical treatment for noise-producing components of earthmoving vehicles has been developed. An example of such noise attenuation systems may be found in U.S. Pat. application Ser. No. 135,065, entitled, "Acoustical Engine Enclosure For Earth-moving Vehicles," filed Apr. 19, 1971, now U.S. Pat. No. 3,762,489, of common assignment herewith.

The environment in which vehicles such as that disclosed in application Ser. No. 135,065 operate is oftimes severe; exposing the vehicle to extremes in temperature and to very dirty and moist conditions. Because of this, acoustical members such as those disclosed in the aforementioned application, quickly become contaminated by oil or the like and by moisture-laden dust particles which readily adhere to the surfaces thereof. Consequently, frequent servicing of the louvers is necessary to remove these contaminants and to assure the continued sound attenuation efficiency of the members. Such servicing normally requires the complete removal of the acoustical members from the vehicle such that the engrossed acoustical material, usually a plastic foam, can be cleaned and the perforations in the holders for the acoustical material may be unplugged. However, in order to remove the members, it is usually necessary to dismantle portions of the earthmoving vehicle, usually the engine enclosure, to gain access to the members. Furthermore, acoustical members are frequently attached to the vehicle by means of fasteners which cannot be readily manually removed for servicing without recourse to special tools. Thus, presently known acoustical systems can be difficult to service and may require time-consuming maintenance procedures.

This invention provides an acoustical louver assembly, more particularly a plurality of acoustical louvers, which are readily accessible and hand removable for servicing and which are firmly retained in place during operation by natural spring biasing afforded by the materials from which the louvers are made and by virtue of an inventive method of installation.

SUMMARY OF THE INVENTION

This invention relates to acoustical louvers for attenuating noise in earthmoving vehicles and to a method of installing such louvers in the earthmoving vehicles. The louvers each comprise a batt or unit of acoustical foam material which is completely protectively enclosed by a D-shaped sheet material holder having perforations therein, which holder and batt are compressed manually for insertion into mounting racks on the vehicle and which are retained in place in said racks without separate fastening means.

The main object of this invention is to provide a readily servicable acoustical louver assembly which eliminates the servicing problems associated with prior art systems.

Other objects and advantages of this invention will become apparent from the following description and claims.

BRIEF DESCRIPTION OF THE DRAWINGS

FIG. 3 is an enlarged sectional view taken along the line III—III in FIG. 2 showing a louver retained within the holder rack member;

FIG. 4 is an enlarged sectional view of an acoustical louver showing the details of construction thereof; and, FIG. 5 is a bottom elevation of a portion of the acoustical louver shown in FIG. 4.

DESCRIPTION OF THE PREFERRED EMBODIMENT

Figure 1:
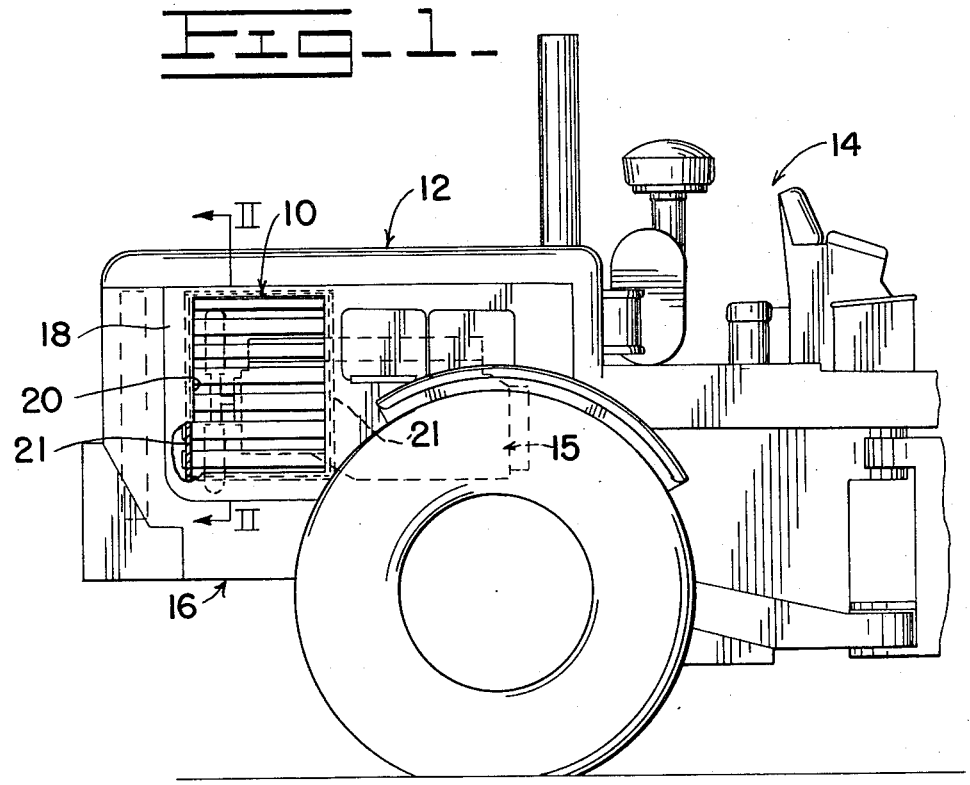
FIG. 1 is a partial elevation of a typical earth-moving vehicle showing the engine compartment area and the placement of the acoustical louvers in accordance with the present invention.

In the drawings, a plurality of acoustical louvers embodying the principles of the present invention are shown generally at 10 in association with an engine enclosure 12 of an earthmoving vehicle 14. The enclosure 12 houses a noise-emitting engine 15 which is mounted on a main frame 16 of the vehicle. A pair of side panels 18 are disposed on opposite sides of the enclosure. In each of said side panels, an air circulation opening 20 is provided for passage of cooling air through the engine enclosure.

The acoustical louvers 10 are disposed laterally across the opening 20 in a predetermined spaced pattern which does not unduly restrict the air flow through the engine enclosure. In this regard, experimentation has shown that optimum spacing of the acoustical louvers occurs when approximately 40 percent of the area of the opening 20 remains unobstructed.

Figure 2:
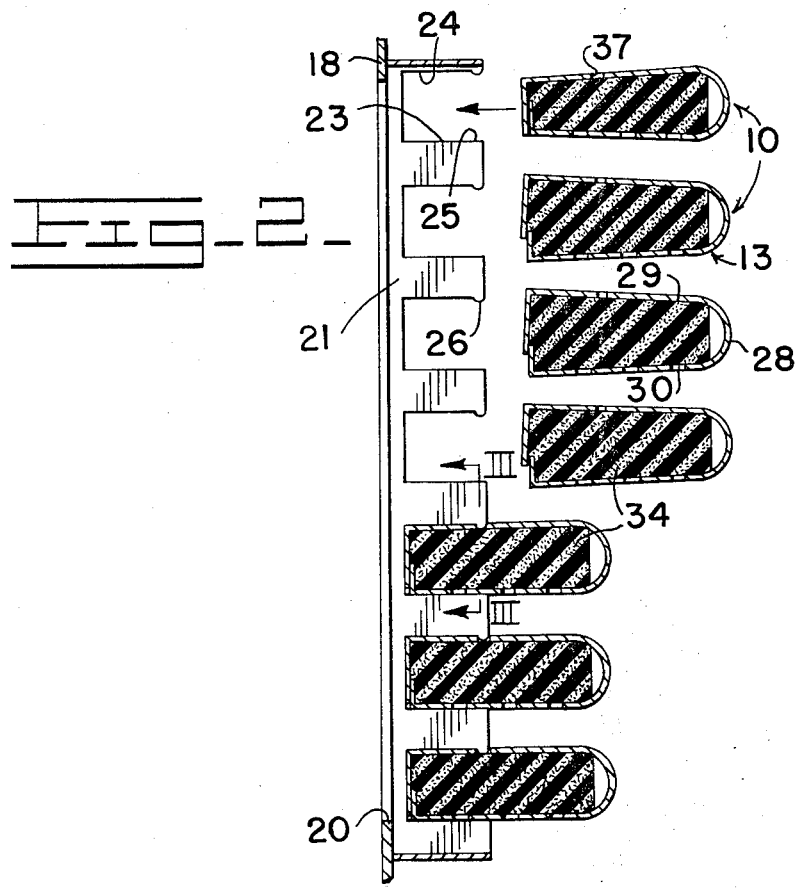
FIG. 2 is a sectional view taken along the line II—II in FIG. 1 and showing an acoustical louver-holding rack member as related to a plurality of acoustical louvers.

The acoustical louvers are mounted upon spaced mounting racks 21 which are disposed on opposite sides of the opening 20 and which are attached to an inside surface of the side panels 18. With reference to FIG. 2, it will be seen that the mounting racks 21 are provided with a plurality of inwardly opening slots 23 for receiving respective end portions of each acoustical louver. Each slot 23 has an upper and lower edge portion 24 and 25 respectively, which portions are spaced a predetermined distance apart. This distance is slightly less than the height of the acoustical louver when it is in free, non-compressed condition as shown, for instance, at 13 in FIG. 2. The upper edge portions 24 of each slot are provided with a downwardly projecting protuberance 26 at the distal ends thereof for interaction with an aperture provided in the louvers as will be more fully explained hereinafter.

With particular reference to FIGS. 3–5, it may be seen that each acoustical louver 10 includes an elongated, D-shaped holder 28 which has upper and lower leg portions 29 and 30 respectively. The D-shaped holder may be manufactured from sheet metal or other sheet materials such as resilient plastics or the like. The leg portions have free end portions 31 and 32 respectively, which are turned inwardly in overlapping relationship to form the base portion of the D-shaped holder. The free end portions are not attached to each other and relative movement therebetween is permitted. With particular reference to FIG. 5, it may be seen that the lower leg portion 30 of the holder 28 is perforate and has a plurality of substantially evenly spaced holes 33 transpiercing it. Optimally, the size and spacing of the holes 33 is such that approximately 40 percent of the perforated area is open to permit the transmission of sound waves therethrough.

With reference to FIGS. 2–4 one may note that the upper leg portion 29 of each of the holders is equipped with an aperture 37 which transpierces the leg portion. One of these apertures is provided in each lateral end of the holder and is adapted to interact with a protuberance 26, disposed on the rack member 21.

Disposed within each of the holders 28 is a batt 34 of acoustical material which has a generally rectangular cross-sectional configuration. As disclosed in aforementioned application Ser. No. 135,065, the particular acoustical material utilized for the batts is preferably a flexible, open cell foam, such as polyester-based urethane with a density of approximately 2 lbs. per cubic foot. The material should have a specific flow resistance of approximately 0.005 pound-seconds per cubic inch. Specific flow resistance as a parameter is discussed in detail in NOISE REDUCTION by Beranek, published by McGraw-Hill, p. 248 (1960). It should be noted that other materials such as fiberglass might be used so long as the appropriate specific flow resistance and flexibility criteria are met.

Disposed around the acoustical batt 34 is a loosely fitting protective film or plastic cover 35 made from polyethylene, Mylar, or the like. The cover 35 greatly extends the life of the foam batt 34 by protecting it from the detrimental effects of grime and moisture found in the environment in which the earthmoving vehicle operates. The cover, however, does not appreciably hinder the noise attenuating propoerties of the foam batt.

The method of installation and removal of the acoustical louvers of the present invention will now be described. When the aforementioned servicing of the louvers is necessary, the louvers 10 may be readily removed by the simple means of manually grasping them along the free ends of the leg portions 29, 30 thereof and compressing the holders and batt elements until the protuberances 26 disengage the apertures 37. With such disengagement, the louvers and their holders 28 may be readily slid from the slots 23 and cocked for removal through the opening 20 in the panel 18. Once removed from the slots 23, the holders 28 spring to the non-compressed position shown in the upper part of FIG. 2 and removal of the acoustic material batts from the holders is readily accomplished by sliding such batts through the open ends of the holders. Once the batts are removed, the film covers 35 may be readily cleaned and the perforations 33 may be easily unclogged. Reassembly of the cleaned louver assemblies into the rack slots 23 may be accomplished by simply reversing the above procedure.

It should be apparent tha the instant invention provides a rapidly removable and installable acoustical louver system for a noise-emitting structure which is durable and which fully protects acoustical batt material from damage in use. While the preferred embodiments of the instant invention have been specifically described herein, it is apparent that other specific shapes and styles of acoustical louvers are possible without departing from the basic spirit of the present invention or the scope of the appended claims.

We claim:

1. In combination; acoustical noise attenuating louver means including; an elongated flexible batt of sound-energy absorbing material, said batt being substantially enclosed by partially perforate sheet material means, said sheet material means being resilient for permitting the compression and expansion of said batt therewithin, mounting rack means, aperture means in said sheet material means for engaging a portion of said mounting rack means to retain said acoustical louver means therein, said resilient sheet material means including a D-shaped member having a curved apex portion and a pair of leg portions extending laterally therefrom, said leg portions each having an end portion folded normally with respect to each of said leg portions, one of said end portions being disposed in overlapping sliding relationship to said end portion.

2. The invention of claim 1 wherein said louver means further includes a loosely-fitted, thin, nonmetallic sheet material cover means disposed between said batt and said sheet material means for prohibiting contamination of said batt without substantially impairing its sound energy absorption characteristics.

3. The invention of claim 1 wherein one of said pair of laterally extending leg portions is perforate and wherein said other of said leg portions is imperforate except for said aperture means.

4. The invention of claim 3 wherein said mounting rack means includes slot means for receiving said louver means, said slot means including first and second parallel surfaces, said second surface having a protuberance engaging said aperture means when said acoustical louver means is mounted within said mounting rack means.

5. The invention of claim 4 wherein laterally extending leg portions are substantially parallel to each other and engage said first and second surfaces respectively when said acoustical louver means is mounted within said mounting rack means, said laterally extending leg portions being disposed normally in unparallel relation when said acoustical louver means is not mounted in said rack means.

6. The invention of claim 1 wherein said sound-energy absorbing material is open-cell polyester-based urethane foam.

7. In combination; acoustical noise attenuating louver means including; an elongated flexible batt of sound-energy absorbing material, said batt being substantially enclosed by partially perforate sheet material means, said sheet material means being resilient for permitting the compression and expansion of said batt therewithin, rigid mounting rack means including first and second parallel disposed rigid members, said first rigid member having a protuberance thereon, aperture means in said sheet material means for engaging said protuberance on said first rigid member to retain said acoustical louver means therein.

\* \* \* \* \*